United States Patent
Campbell et al.

(10) Patent No.: US 11,503,080 B2
(45) Date of Patent: *Nov. 15, 2022

(54) REMOTE MANAGEMENT OF A USER DEVICE

(71) Applicant: Trinomial Global Ltd, London (GB)

(72) Inventors: Thomas Campbell, London (GB); Kasun Mallika Arachchilage, London (GB)

(73) Assignee: Trinomial Global Ltd, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 17/479,803

(22) Filed: Sep. 20, 2021

(65) Prior Publication Data

US 2022/0006841 A1   Jan. 6, 2022

Related U.S. Application Data

(63) Continuation of application No. 17/093,164, filed on Nov. 9, 2020, now Pat. No. 11,159,575, which is a
(Continued)

(51) Int. Cl.
*G06F 15/173* (2006.01)
*H04L 9/40* (2022.01)
(Continued)

(52) U.S. Cl.
CPC .......... *H04L 63/20* (2013.01); *H04L 41/0893* (2013.01); *H04L 67/55* (2022.05); *H04L 67/62* (2022.05); *H04W 4/14* (2013.01)

(58) Field of Classification Search
CPC ..... H04L 63/20; H04L 41/0893; H04L 67/26; H04L 67/325; H04W 4/14
(Continued)

(56) References Cited

U.S. PATENT DOCUMENTS 7,317,699 B2   1/2008 Godfrey et al.
7,607,164 B2*  10/2009 Vasishth ............... G06F 21/62
                                                        709/225
(Continued)

FOREIGN PATENT DOCUMENTS

WO   2000025214 A1   5/2000
WO   2014084967 A1   6/2014
WO   2017172818 A1   10/2017

OTHER PUBLICATIONS

International Search Report and Written Opinion dated Oct. 17, 2019 or PCT Application No. PCT/EP2019/058330.
(Continued)

*Primary Examiner* — Atta Khan
(74) *Attorney, Agent, or Firm* — EIP US LLP

(57) ABSTRACT

There is provided a user device including a transceiver, a processor, and a memory. The memory stores a device management application (DMA) arranged to disable at least one function of the user device in accordance with an operative device policy state of the user device, and a device policy schedule comprising a queue of device policy states each having an associated respective set of policy data. Responsive to receiving, from a remote system via the transceiver, first synchronisation data indicating a first
(Continued)

device policy state in the queue of device policy states, the DMA is arranged to update the operative device policy state of the user device to the indicated first device policy state.

16 Claims, 6 Drawing Sheets

Related U.S. Application Data continuation of application No. PCT/EP2019/058330, filed on Apr. 2, 2019.

(51) Int. Cl.
*H04L 41/0893* (2022.01)
*H04W 4/14* (2009.01)
*H04L 67/55* (2022.01)
*H04L 67/62* (2022.01)

(58) Field of Classification Search
USPC .......................................................... 709/223
See application file for complete search history.

(56) References Cited

U.S. PATENT DOCUMENTS

| | | | |
|---|---|---|---|
| 2009/0182802 A1* | 7/2009 | Tran | H04L 41/046 709/221 |
| 2013/0091543 A1* | 4/2013 | Wade | G06F 21/53 726/1 |
| 2014/0113593 A1 | 4/2014 | Zhou et al. | |
| 2014/0157353 A1 | 6/2014 | Shim et al. | |
| 2015/0207686 A1* | 7/2015 | Raleigh | H04L 67/51 370/329 |
| 2015/0227741 A1* | 8/2015 | Permeh | H04L 63/12 726/22 |
| 2016/0205493 A1 | 7/2016 | Ricket | |
| 2016/0323771 A1* | 11/2016 | Raleigh | H04L 41/0893 |
| 2016/0330241 A1* | 11/2016 | Olivera | H04L 63/20 |

OTHER PUBLICATIONS

United States non-final office action dated Feb. 18, 2021 for U.S. Appl. No. 17/093,164.
Google, Build a Device Policy Controller, Sep. 11, 2018, developer.android.com, archive.org Jan. 7 edition (Year: 2019).

* cited by examiner

REMOTE MANAGEMENT OF A USER DEVICE

CROSS-REFERENCE TO RELATED APPLICATIONS

This application is a continuation of U.S. application Ser. No. 17/093,164, filed Nov. 9, 2020, which is a continuation under 35 U.S.C. § 120 of International Application No. PCT/EP2019/058330, filed Apr. 2, 2019 under 35 U.S.C. § 119(a). The entire contents of the above-referenced patent applications are hereby incorporated by reference.

BACKGROUND

Field of the Invention

The present invention relates to remote management of a user device, for example a smartphone or the like, utilising novel control techniques within the user device.

Description of the Related Technology

In certain situations, it is beneficial for an enterprise to have some remote control over the functionality of a user device. For example, an enterprise may wish to restrict which software applications are accessible by the user device, or to remotely apply settings, such as security settings, in respect of one or more software applications or the device as a whole. An example of a situation in which an enterprise may wish to have remote control of a user device is where an employee uses a smartphone or other communication device exclusively or partially for work purposes. In such an example, the enterprise may wish to apply minimum security settings to the device, and to have the ability to remotely delete work-related data from the device if the smartphone is reported as lost or stolen.

For certain smartphone operating systems, software tools are available which allow an enterprise to remotely manage a mobile phone on which the operating system is loaded. Such tools may be provided by a manufacturer of a device and/or operating system as part of a mobile device management (MDM) framework. To utilise this functionality, a special software application referred to as a device management application (DMA) is installed on the smartphone. The DMA has enhanced privileges compared with other software applications (apps) running on the smartphone. The DMA enforces device policies, specified by the enterprise, that restrict or otherwise modify the functionality of the user device. The DMA cannot be modified or deleted by the user of the device.

Existing tools for enterprise management of a user device are primarily designed to ensure that devices satisfy security requirements, imposed by an enterprise, which are independent of actions taken by users of the devices.

SUMMARY

According to a first aspect of the present invention, there is provided a user device including a transceiver, a processor, and a memory. The memory stores a device management application (DMA) arranged to disable at least one function of the user device in accordance with an operative device policy state of the user device, and a device policy schedule comprising a queue of device policy states each having an associated respective set of policy data. Responsive to receiving, from a remote system via the transceiver, first synchronisation data indicating a first device policy state in the queue of device policy states, the DMA is arranged to update the operative device policy state of the user device to the indicated first device policy state.

According to a second aspect of the invention, there is provided a computer program product including machine readable instructions. When executed by a processor of a user device, the machine readable instructions cause the user device to, responsive to receiving first synchronisation data from a remote system via a transceiver of the user device: select a first device policy state from a device policy schedule stored on the user device and including a queue of device policy states each comprising a respective set of policy data; update an operative device policy state of the user device to a first device policy state in the queue of device policy states; and control functionality of the user device in accordance with the updated operative device policy state.

According to a third aspect of the invention, there is provided a method of remotely managing a user device. The method includes provisioning the user device with a device management application (DMA) configured to control functionality of the user device in accordance with an operative device policy state of the user device, provisioning the user device with a device policy schedule comprising a queue of device policy states each comprising a respective set of policy data, and transmitting, from a remote system to the user device, first synchronisation data indicating an update of the operative device policy state of the user device to a first device policy state in the queue of device policy states.

Further features and advantages of the invention will become apparent from the following description of embodiments of the invention, given by way of example only, which is made with reference to the accompanying drawings.

DETAILED DESCRIPTION

Figure 1:
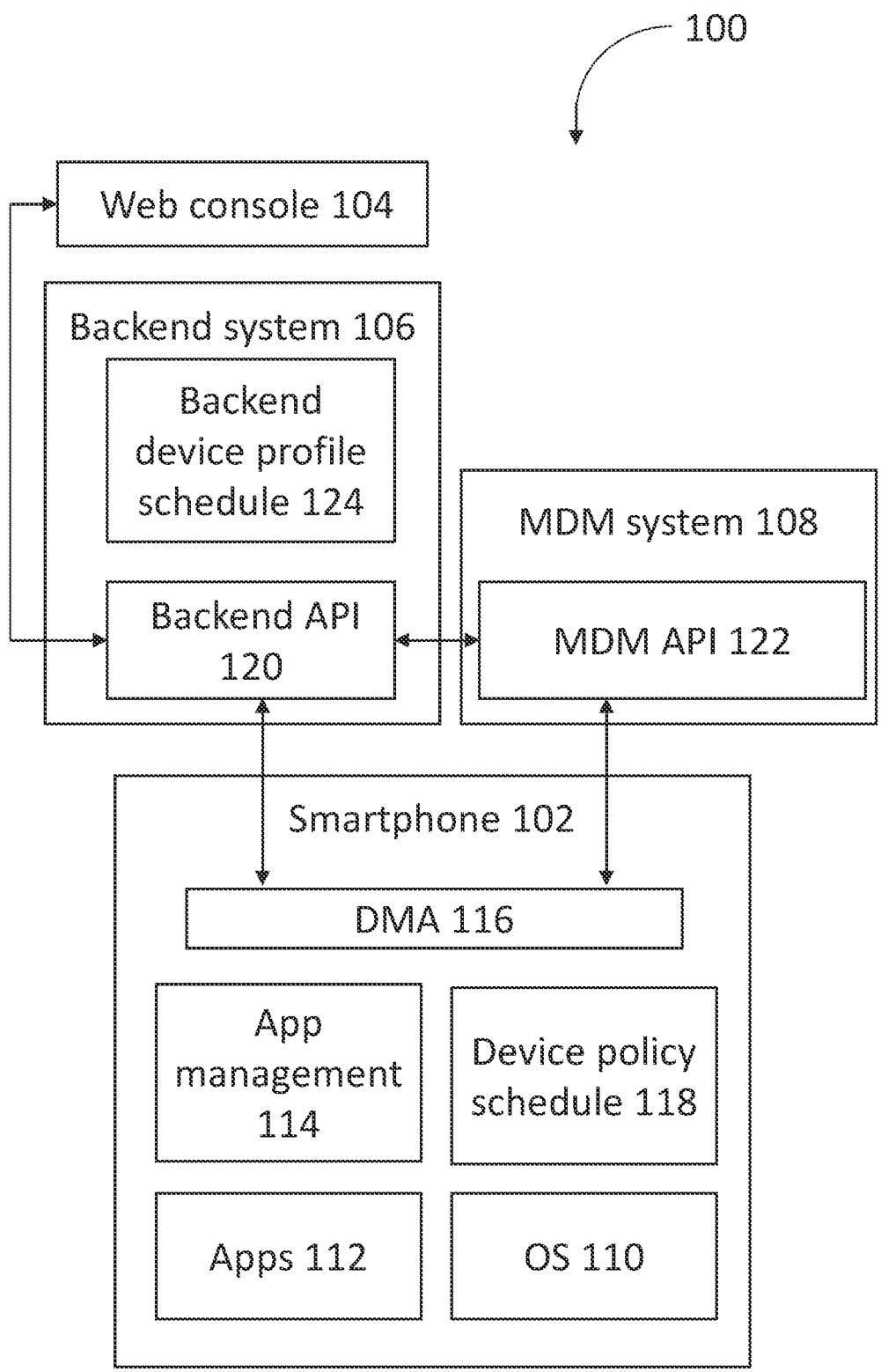
FIG. 1 is a schematic block diagram showing an example of a system for remotely managing a smartphone.

FIG. 1 shows an example of a system 100 including a smartphone 102, a web console 104, a backend system 106, and a mobile device management (MDM) system 108. A smartphone is a mobile telephone that, in addition to being arranged to perform conventional audio communications, has processing circuitry that is capable of executing downloaded software applications, commonly referred to as apps. In other examples, the methods described herein may instead be applied in respect of, for example, a desktop computer, a laptop computer, or a tablet computer.

In the example of FIG. 1, the smartphone 102 includes the following software components:
- an operating system (OS) 110;
- one or more apps 112;
- an app management component 114; and
- a device management application (DMA) 116.

The DMA 116 is a custom-built software component configured to carry out methods in accordance with the present invention. The DMA 116 enforces device policies on a user device on behalf of a remote party other than the user of the device. The device policies can be used to restrict or otherwise modify the functionality of the user device. The DMA 116 cannot be modified or deleted by the user of the device.

The OS 110 may be, for example, a version of the Android OS, in which case the DMA 116 may be implemented as a custom device policy controller (DPC) or as a system app. A system app is an app installed on an Android device under a read-only /system/app folder. Apps installed under the system/app folder may not be uninstalled by a user of the device. The OS 110 may alternatively be a version of iOS or Tizen, or any other suitable OS. In the case of a Samsung device running on a version of the Tizen operating system or a version of the Android operating system, a DMA may be integrated within the Samsung Knox Workspace. It will be appreciated that methods described herein could be implemented on devices During an enrolment process that will be described in more detail hereafter, the DMA 116 is appointed as the owner of a managed device profile of the smartphone 102. A profile owner is an application installed within a managed profile that has exclusive control over policies enforced in respect of that profile. In this example, the smartphone 102 is a fully-managed device, meaning that the only device profile of the smartphone 102 is the managed device profile owned by the DMA 116 (in other words, the DMA 116 is appointed as the device owner of the smartphone 102).

The DMA 116 is arranged to communicate with the backend system 106 via a backend application programming interface (API) 120, and with the MDM system 108 via an MDM API 122.

In the example of FIG. 1, the smartphone 102 is for leasing to a user by a leasing company under an associated payment contract. The leasing company wishes to have a means of incentivising a user of the smartphone 102 to pay any overdue bill by, for example, remotely restricting or otherwise controlling the functionality of the smartphone 102. Accordingly, a billing platform (not shown) of the leasing company communicates with the backend system 106 to notify the backend system 106 of various events relating to the smartphone 102, for example when a payment becomes overdue, and the backend system 106 communicates with the DMA 116 to control the functionality of the smartphone accordingly.

The DMA 116 has access to a device policy schedule 118 stored on the smartphone 102, which includes a queue of device policy states each having an associated respective set of policy data. In this example, each device policy state in the queue of device policy states is more restrictive than the previous device policy state in the queue. Specifically, the device policy states in the queue cumulatively disable functionality of the smartphone 102 as the device policy schedule is progressed. For example, a first device policy state may specify that a first category of apps 112 (for example, social apps) is to be disabled. A second device policy state may further specify that a second category of apps 112 is also to be disabled (for example, entertainment apps). A third device policy state may specify that all functionality of the smartphone 102 is disabled, except for except for voice calls, short messaging service (SMS), and emergency apps, resulting in the functionality of the smartphone 102 being reduced to that of a so-called feature phone. A final device policy state (referred to as a terminal device policy state) may specify that all functionality of the smartphone 102 is disabled, apart from the ability to make emergency calls. In another example, a device policy state may specify that a predetermined number of the apps 112 are to be disabled on the basis of usage data (for example, the most used apps 112 may be disabled). In other examples, device policy states may be arranged such that functionality is not disabled in a cumulative manner. For example, a first device policy state may disable only a first category of apps, and a second device policy state may disable only a second, different, category of apps. In some examples, a device policy schedule may include additional steps that do not specify a device policy state, but instead specify an action to be performed by the DMA 116, such as presenting a notification to the user of the smartphone 102 via a user interface. Such a notification may be used, for example, to remind the user that a bill is overdue.

As will be described in more detail hereafter, the backend system 106 can remotely initiate the device policy schedule 118 on the smartphone 102, causing the smartphone 102 to progress through queued device policy states in the device policy schedule 118, by sending signals to the DMA 116 via the backend API 120. The device policy schedule 118 could be initiated, for example, in response to a bill not being paid in due time, or in response to a bill being overdue for a predetermined amount of time.

In the same way as other apps, the DMA 116 can be opened by a user by selection of an icon representing the DMA 116. On opening by the user, the DMA 116 presents a user interface via which the user of the smartphone 102 is able to view information regarding the device policy schedule 118. In particular, the user interface presents to the user of the smartphone 102 the current status of the smartphone within the device policy schedule and the consequences of performing or not performing specific actions by specified times, for example not paying a bill due to the leasing enterprise in respect the smartphone 102. The DMA 116 may further be configured to notify a user when the device policy schedule 118 is initiated and/or when the operative device policy state is updated. The notification may inform the user of which functions of the smartphone 102 are to be disabled or modified at the next update of the operative device policy state, and when this is scheduled to occur.

The DMA 116 has access to framework APIs within the operating system 110 that are inaccessible to the other apps 112. These framework APIs allow the DMA 116 to restrict or modify the functionality of the smartphone 102 in accordance with a set of operative device policies. It is not possible for the user of the smartphone 102 to remove the DMA 116 from the smartphone 102, either directly or, for example, by performing a factory reset of the smartphone 102, as the factory reset function is disabled by the DMA 116 during enrolment of the smartphone 102 with the backend system 106, as will be described in more detail hereafter.

In the example of FIG. 1, the backend system 106 is operated by a third party service provider. The third party service provider provides enterprise management of user devices in accordance with the present invention on behalf of multiple enterprises, including the leasing company of the smartphone 102. In other examples, enterprise management may be performed directly by an enterprise instead of by a third party service provider. In such an example, a backend system would be operated directly by the enterprise.

The web console 104 is a website operated by the third party service provider. An administrator for an enterprise, referred to hereafter as an enterprise admin, can log into the web console 104 to perform actions relating to the enterprise management of user devices associated with that enterprise, for example to enroll new user devices with the enterprise or to update policy settings for enrolled user devices. In other words, the web console 104 provides an interface between enterprises and the backend system 106. In this example, the web console 104 is a React web application served from an Amazon Web Service (AWS) Simple Storage Service (S3) bucket, though it will be appreciated that in other examples, alternative services may be employed for this purpose. The web console 104 communicates with the backend system 106 via the backend API 120. The backend system 106 stores data relating to multiple user devices, including the smartphone 102. In this example, the user devices are grouped according to enterprise, such that an enterprise admin for a particular enterprise can manage groups of user devices associated with that enterprise. In other examples, an enterprise may be divided into several groups, allowing increased flexibility for large enterprises which may wish to specify different device policy schedules for different groups of users. In accordance with the present invention, the backend system 106 stores backend device policy schedules for the user devices, including a backend device policy schedule 124 for the smartphone 102. The device policy schedule 118 stored by the smartphone 102 may be synchronised with the backend device policy schedule 124.

In the present example, MDM system 108 is operated by the provider of the OS 110, though in other examples an MDM system may be operated by a manufacturer of a device or by a third party, such as the third party that operates the backend system 106. In some examples, an MDM system may include the functionality of the backend system 106, or vice versa. The MDM system 108 manages the apps 112 installed on the smartphone 102 on behalf of an enterprise admin using the app management component 114 installed on the smartphone 102. The MDM system 108 receives information from the backend system 106 regarding preferences specified at the enterprise level by enterprise admins of the web console 104. For example, an enterprise admin may require that specific apps are installed on the smartphone 102, prevented from being installed on the smartphone 102, or prevented from being removed from the smartphone 102, and may specify managed configurations for one or more of the apps 112 installed on the smartphone 102. A managed configuration of an app specifies permissions for various capabilities of the app, where the relevant capabilities are specified by a developer of the app in a managed configurations schema. According to the managed configuration, permissions may be set to "granted", "denied" or "user decide". For example, a managed configuration of an app may specify that permission to exchange data via a mobile network is denied, but that permission to exchange data via Wi-Fi is granted. A managed configuration may specify that the user can decide whether the app is allowed to use an onboard camera of the smartphone 102. A managed configuration may also specify further restrictions such as blacklisting or whitelisting certain universal resource locators (URLs) for access by a web browser or other app.

As will be described in more detail hereafter, during an enrolment process, the DMA 116 is associated with an account on the MDM system 108, which allows the DMA 116 to delegate the implementation of managed configurations to the app management component 114. In other examples, a DMA may directly implement managed configurations of apps, as well as device policies, as specified by an enterprise.

Figure 2:
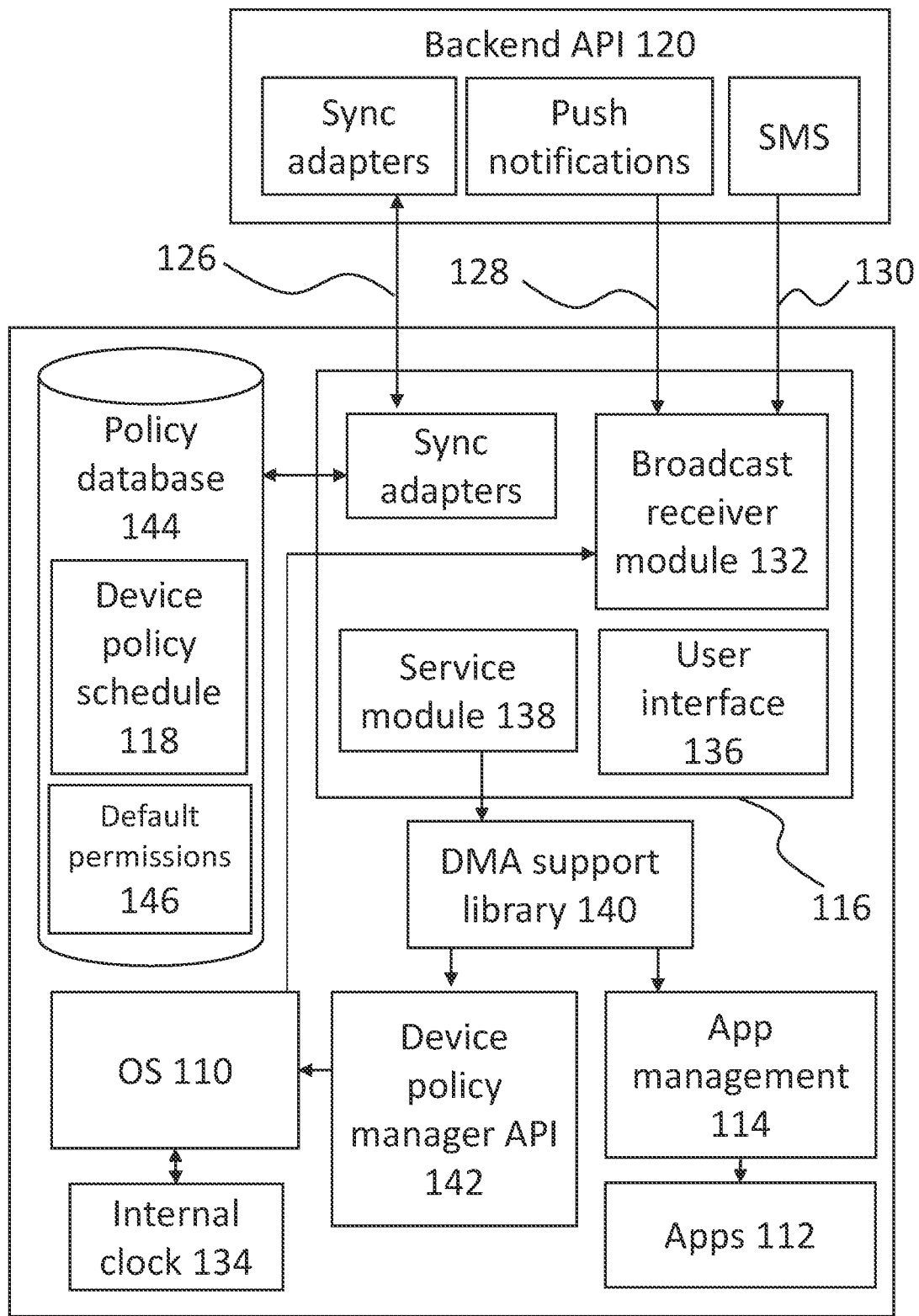
FIG. 2 is a schematic block diagram showing additional details of components of the system of FIG. 1.

FIG. 2 shows components of the backend API 120 and the smartphone 102 arranged in accordance with the present invention. In the present example, the backend API communicates with the DMA 116 installed on the smartphone 102 using sync adapters 126, push notifications 128, and SMS messages 130. In the present example, push notifications 128 are sent using the Firebase Cloud Messaging (FCM) service, and SMS messages 130 are sent using the AWS SMS service, though in other examples, push notifications and/or SMS messages may be sent using alternative services, or may be sent directly from a backend system. The sync adapters 126 include a device data sync adapter and an application data sync adapter, which are configured to sync device policy data and app management data respectively.

The DMA 116 includes a broadcast receiver module 132, which is configured to receive broadcasts relating to certain events occurring within the smartphone 102. Broadcasts are messages generated by the OS 110 or apps 112 when certain events occur within the smartphone 102. In this example, the broadcast receiver module 132 is configured to receive broadcasts when an app is installed or uninstalled from the smartphone 102, when the smartphone 102 is booted up, when an SMS message is received by the smartphone 102, when a push notification is received by the smartphone 102, and when the OS 110 generates an alarm based on an internal clock 134 of the smartphone 102.

As mentioned above, the DMA 116 also includes a user interface 136 such that a user of the smartphone 102 can interact with the DMA 116 in the same way as with the apps 112. In this example, the user interface 136 allows the user to view information relating to the device policy schedule 118, including an operative device policy state, and information relating to queued device policy states. The user interface 136 does not allow the user to modify device policy states enforced by the DMA 116, as these can only be modified by an enterprise admin through the web console 104.

The DMA 116 includes a service module 138 for enforcing device policies in accordance with an operative device policy state. The service module 138 calls functions within a DMA support library 140, allowing the service module 138 to communicate the device policies to the OS 110 via a device policy manager API 142. The DMA support library 140 also includes functions for enrolment of the smartphone 102, which in this example includes delegation of managed configurations of the apps 112 to the app management component 114 as mentioned above.

In the present example, the device policy schedule 118 is stored in a policy database 144, which is a virtual object database configured with object-relational mapping (ORM). The policy database 144 also stores a set of default permissions 146 which the DMA 116 enforces during enrolment of the smartphone 102 with the backend system 106 (i.e. at the point of installation of the DMA 116). The default permissions 146 are necessary to ensure that the user of the smartphone 102 cannot circumvent the restrictions imposed by the DMA 116. In this example, the default permissions 146 for USB debugging and factory reset of the smartphone 102, and for changing the time of the internal clock 134, are all set to "denied". The default permissions 146 are operative for as long as the DMA 116 is installed on the smartphone 102, corresponding to the period during which the smartphone 102 is managed by the leasing enterprise.

Figure 3:
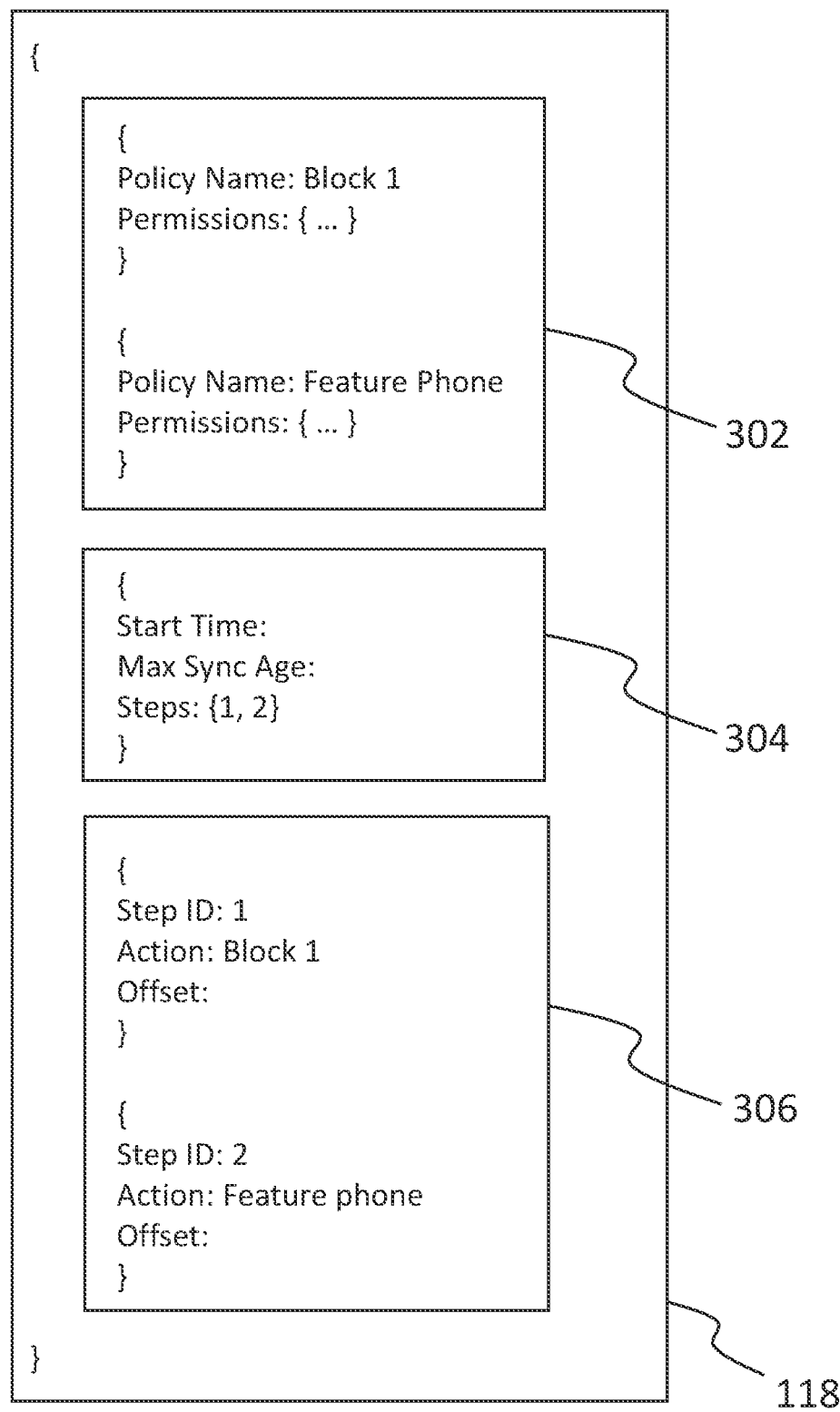
FIG. 3 shows an example data structure of a device policy schedule for a smartphone.

FIG. 3 shows the structure of the device policy schedule 118. The device policy schedule 118 includes multiple device policy states 302, each of which has associated policy data including a Policy Name and a set of permissions. In the example of FIG. 3, two device policy states 302 are defined, named "Block 1" and "Feature Phone". The permissions associated with Block 1 specify that all of the apps 112 in the "social" category are disabled. The permissions associated with Feature Phone specify that all functionality of the smartphone 102 is disabled, except for voice calls, short messaging service (SMS), and emergency apps. The Feature Phone device policy state is more restrictive than the Block 1 device policy state, as the Feature Phone device policy state disables apps 112 in the social category, as well as other apps 112 and other functions of the smartphone 102 (including, for example, use of an inbuilt camera of the smartphone 102).

The device policy schedule 118 includes scheduling data 304. The scheduling data 304 includes a "Start Time" data field, which takes as an argument a time stamp that provides a reference time from which subsequent "Offset" times are measured. The Offset times then define times at which actions are to be taken by the DMA 116, as will be described hereafter. The argument of the Start Time data field may initially be set to zero or NULL, which is interpreted to mean that the device policy schedule has not been initiated, and that the only action to be taken by the DMA 116 is to enforce the default permissions 146.

The scheduling data 304 includes a "Max Sync Age" data field. The Max Sync Age defines a maximum duration of time that the DMA 116 waits for synchronisation data from the backend API 120, before enacting a terminal device state. The Max Sync Age may be set, for example, as 10 days, 30 days, 60 days, or any other suitable period of time depending on the requirements of the leasing enterprise. The terminal device state is chosen to be the most restrictive of the device policy states 302, and in the present example is the only device policy state that the DMA 116 will enact without receiving data from the backend API 120. In this way, the user of the smartphone 102 is not able to continue using offline functions of the smartphone 102 indefinitely by, for example, taking the smartphone 102 to a location where no communication link with the backend API 120 can be established. In the present example, the Feature Phone device policy state is the terminal device policy state. The scheduling data 304 further includes a list of steps, each having a Step ID. The present example includes two steps having Step IDs 1 and 2 respectively.

The device policy schedule 118 includes step data 306, which includes information regarding the steps defined in the scheduling data 304. For each of the steps defined in the scheduling data, the step data 306 includes a step ID, an Action, and an Offset. The Action refers to the action to be taken by the DMA 116 when the step is enacted. In the present example, the Action for each step corresponds to a Policy Name of one of the device policy states 302. In order to enact one of these steps, the DMA 116 changes an operative device policy state of the smartphone 102 to the device policy state 302 with the specified name. In other examples, a step may define an Action that does not correspond to a device policy state. For example, a step may define an Action that causes the DMA 116 to notify the user of the smartphone 102 that a bill is overdue, and/or that a restrictive action will be enforced by the DMA 116 if a bill is not paid by a certain date. The Offset for each step defines an interval from the Start Time at which the DMA 116 is to enact that step.

The device policy states 302, the scheduling data 304, and the step data 306, define a queue of device policy states each having an associated respective set of policy data. It will be appreciated that the arrangement of the device policy schedule 118 is exemplary, and that equivalent information could be arranged differently without departing from the scope of the invention.

Figure 4:
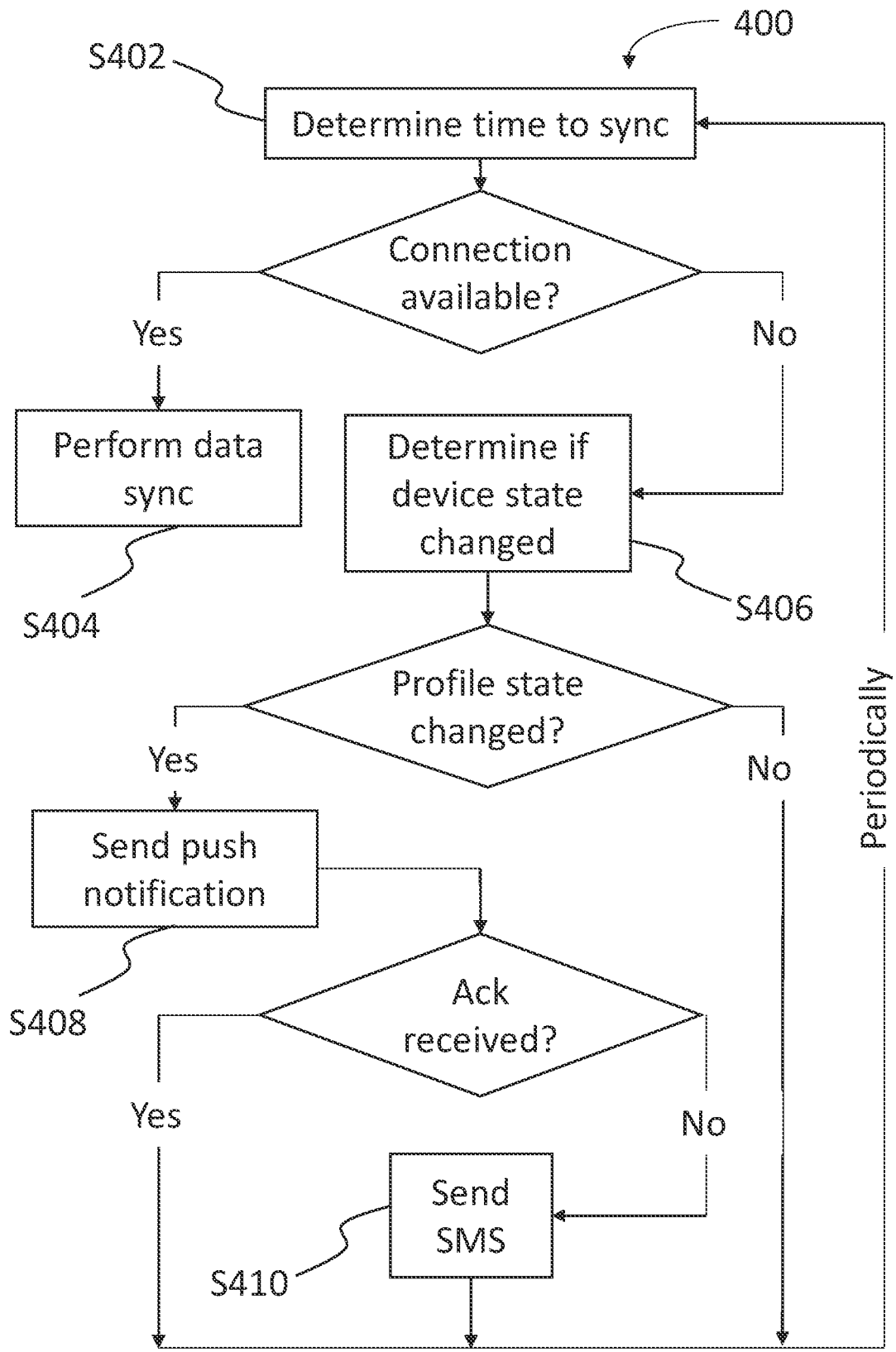
FIG. 4 is a flow diagram representing a method for synchronising data between a backend system and a smartphone.

FIG. 4 shows an exemplary method 400 in which the device policy schedule 118 on the smartphone 102 is updated by the backend system 106. Periodically, the device data sync adapter determines, at S401, that it is time to sync device policy data between the backend system 106 and the smartphone 102. The syncing period may be, for example, one hour, twelve hours, twenty four hours, or any other suitable period. If, at the syncing time, a data connection is available between the smartphone 102 and the backend API 120 (for example, via a cellular connection or a Wi-Fi connection at the smartphone 102), the device data sync adapter performs, at S404, a data sync which updates the device policy schedule 118 stored in the policy database 146 to match the backend device policy schedule 124. In this way, any change made by an enterprise admin of the web console 104 to the backend device policy schedule 124 is automatically updated in the locally stored device policy schedule 118 at the next scheduled syncing time. Furthermore, if a Start Time is entered into the backend device policy schedule 124 (for example, because a message is received from the billing platform of the leasing enterprise indicating that a bill has become overdue in respect of the smartphone 102), this Start Time will be copied to the device policy schedule 118. Once a Start Time has been established in the backend device policy schedule 124, the backend system 106 automatically advances through the queue of device policy states in accordance with the Start Time and the respective Offsets defined in the backend device policy schedule 124. Each time a step is reached for which the Action corresponds to a device policy state, the backend device policy schedule 124 is updated to indicate a change in the operative device policy state. In response to this data being synced to the smartphone 102, the DMA 116 enacts the permissions defined within the indicated operative device policy state.

In order to perform the data sync at S404, the device data sync adapter causes the DMA 116 and the backend system 106 to generate checksums from the device policy schedule 118 and the backend device policy schedule 124 respectively. A checksum is a small-sized datum derived from a block of digital data, having the property that even a small change to the block of digital data will result in a completely different checksum, and therefore comparing checksums for two blocks of data is an efficient way of checking whether the two blocks are identical. The checksums generated by the DMA 116 and the backend system 106 are compared, for example by the backend system 106. If the checksums match, the device policy schedule 118 and the backend device policy schedule 124 are identical and no further synchronisation is required. If the checksums do not match, the backend system 106 transmits a copy of the device policy schedule 124 to the smartphone 102 to replace the device policy schedule 118 stored locally on the smartphone 102. Once the device policy schedule 118 has been updated, the DMA 116 determines whether the updated device policy schedule 118 indicates a different operative device policy state to the current operative device policy state of the smartphone 102, and if so, changes the operative device policy state of the smartphone 102 accordingly. It will be appreciated that the use of sync adapters as described above is exemplary, and other methods of syncing data between a server and a user device may be used without departing from the scope of the invention.

If no data connection is available between the smartphone 102 and the backend API 120, or if the data sync is otherwise unsuccessful, the backend system 106 determines, at S406, whether the operative device policy state indicated in the backend device policy schedule 124 has changed since the last successful sync. If it is determined that the operative device policy state has not changed, no further action is taken by the backend system 106 until the next scheduled sync time. If, on the other hand, it is determined that the operative device policy state has changed, the backend system 106 generates and sends, at S408, a push notification to the smartphone 102. The push notification is in JavaScript Object Notation (JSON) format, and encrypted such that it can only be decrypted by the smartphone 102 using a private key provided to the smartphone 102 during enrolment of the smartphone 102 with the backend system 106. The push notification specifies one of the device policy states in the backend device policy schedule 124.

The broadcast receiver module 132 of the DMA 116 receives a broadcast from the OS 110 indicating that the a push notification has been received. The DMA 116 determines that the push notification is intended for processing by the DMA 116, and decrypts the push notification using the private key provided during enrolment. The DMA 116 reads the JSON data stored within the push notification, and attempts to send an acknowledgement message to the backend system (for example, via one of the sync adapters 126) indicating that the push notification was received by the DMA 116. If the device policy state specified in the push notification corresponds to one of the device policy states 302 stored by the smartphone 102, the acknowledgement message indicates that the DMA 116 recognises the specified device policy state and will change the operative device policy of the smartphone 102 accordingly. The DMA 116 changes the operative device policy state of the smartphone 102 to the device policy state specified in the push notification. If the backend system 106 receives an acknowledgement message from the DMA 116 within a predetermined period of time, no further action is taken by the backend system 106 until the next scheduled sync time.

If the backend system 106 does not receive an acknowledgement message from the DMA 116 in the predetermined amount of time, the backend system 106 generates and sends, at S410, an SMS message to the smartphone 102 containing the same encrypted JSON data as sent in the push notification at S408. The broadcast receiver module 132 of the DMA 116 receives a broadcast from the OS 110 indicating that the an SMS message has been received. The DMA 116 determines that the SMS message is intended for processing by the DMA 116, decrypts the SMS message, and reads the JSON data stored within the push notification. If the DMA 116 did not receive the corresponding push notification, and the DMA 116 recognises the device policy state specified in the SMS message, the DMA 116 changes the operative device policy state of the smartphone 102 to the device policy state specified in the SMS message.

The method 400 of FIG. 4 involves three separate methods of transmitting synchronisation data to the smartphone 102. The initial synchronisation attempt using the sync adapters 126 allows for flexible updating of the device policy schedule 118 by an enterprise admin of the web console 104, whilst providing that the operative device policy state of the smartphone 102 is updated regularly in an efficient manner. However, the full data sync requires a reliable connection to be established between the backend API 120 and the smartphone 102. In certain circumstances, such a connection may not be available. One such example is where the smartphone 102 is used in a country or region with poor cellular data coverage. Accordingly, the method 400 provides two alternative methods for updating the operative device profile state of the smartphone when the full data sync is not possible. It is noted that in cases where a full data sync is not possible, it may not be viable to send the entire backend device policy schedule 124 to the smartphone 102. In accordance with the present invention, the smartphone 102 stores locally the device policy schedule 118, which is a copy of the backend device policy schedule 124 at the last successful data sync. The operative device profile can therefore be changed remotely with only a small amount of data needing to be transferred when a reliable data connection between the backend API 120 and the smartphone 102 is not available.

In the present example, changes to the operative device state of the smartphone 102 are initiated by means of data being transferred from the backend system 106, for example as described above with reference to FIG. 4, as opposed to being initiated locally by the smartphone 102. In this way, the operative device policy of the smartphone 102 will not be changed erroneously, for example when a bill has in fact been paid but a data connection with the smartphone 102 is unavailable. It is anticipated, however, that a user of the smartphone 102 may attempt to circumvent the system by avoiding synchronisation between the backend system 106. A simple way to do this would be to avoid any form of data connection (for example, by keeping smartphone 102 away from any cellular or Wi-Fi signal, or by keeping the smartphone 102 in airplane mode), though more sophisticated methods are also envisaged. In order to avoid such attempts being successful, the device policy schedule 118 stored on the smartphone 102 includes a terminal device policy state, to which the DMA 116 will default if no successful data sync has been performed after a predetermined amount of time. It is noted that in alternative embodiments, all changes to the operative device policy state may be initiated locally by a user device.

Figure 5:
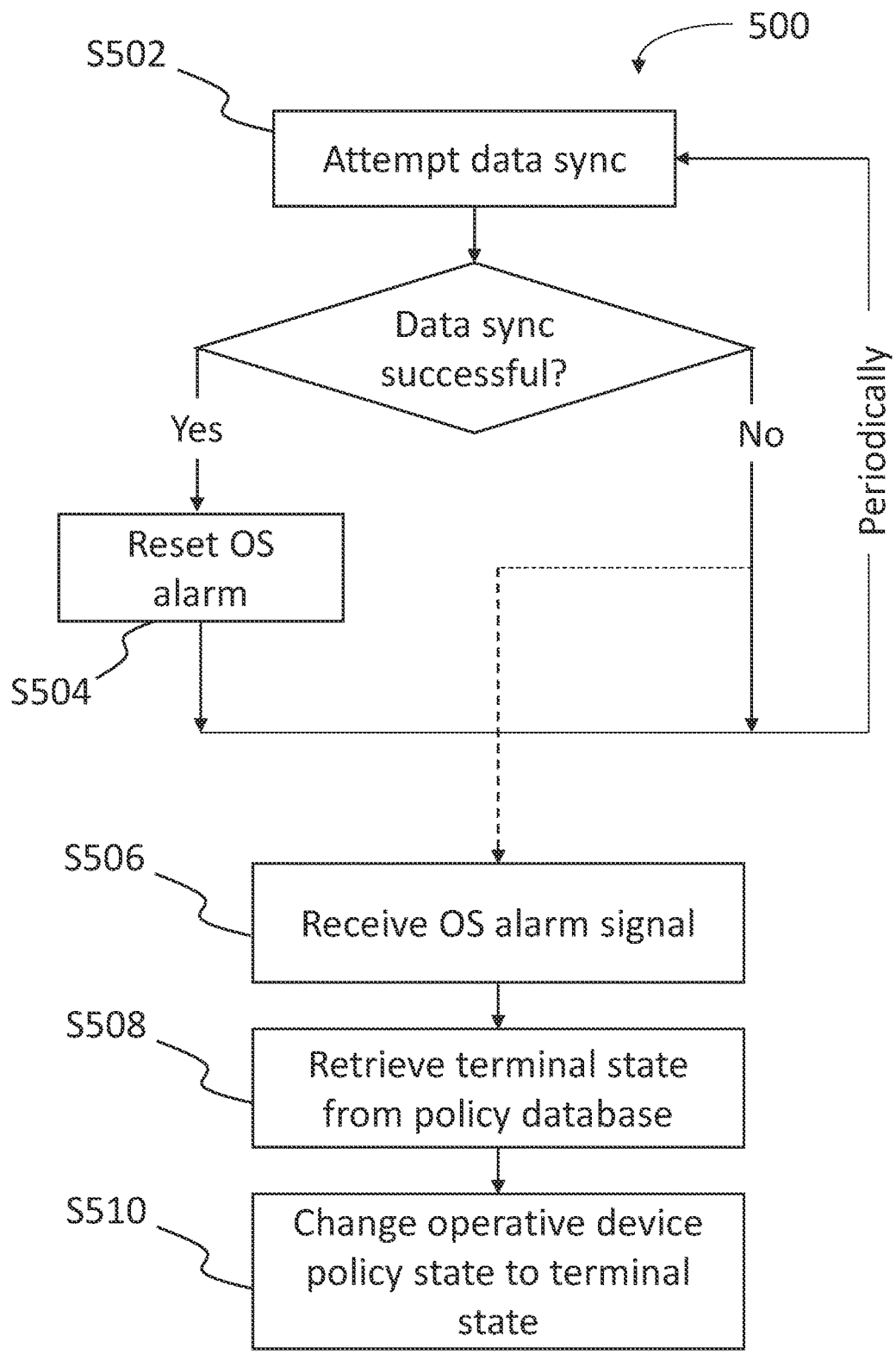
FIG. 5 is a flow diagram representing a method for initiating a terminal device policy state on a smartphone.

FIG. 5 shows an exemplary method 500 in which the DMA 116 enacts a terminal device policy state. DMA 116 attempts, at S502, to perform a data sync using the device data sync adapter of the sync adapters 126. If the data sync is successful, the DMA 116 resets, at S504, an alarm in the OS 110 in accordance with the max sync age defined in the device policy schedule 118. Specifically, the alarm is set to be activated when the time, as measured using the internal clock 134, exceeds the time at which the data sync was performed by the max sync age. It is noted that the default permissions 146 ensure that the user of the smartphone 102 is unable to alter the time as measured by the internal clock 134, which may otherwise allow the user to prevent the OS alarm from being activated.

The device data sync adapter periodically attempts to perform a data sync as described above with reference to FIG. 4. If attempts by the sync adapter to perform the data sync are repeatedly unsuccessful, the broadcast module 134 of the DMA 116 receives, at S506, an alarm signal from the OS 110 at the time specified at S504. In response to receiving the alarm signal 110, the DMA 116 retrieves, at S508, the terminal device policy state specified by the device policy schedule 118 from the policy database 144. The DMA 116 then changes, at S510, the operative device policy state of the smartphone 102 to the retrieved terminal device policy state. It will be appreciated that other methods of activating a terminal device policy state may be used as an alternative to the method 500 of FIG. 5. For example, in some embodiments a DMA may check during each data sync attempt whether the time measured by the internal clock 134 exceeds the time of the most recent successful data sync by more than the max sync age.

Figure 6:
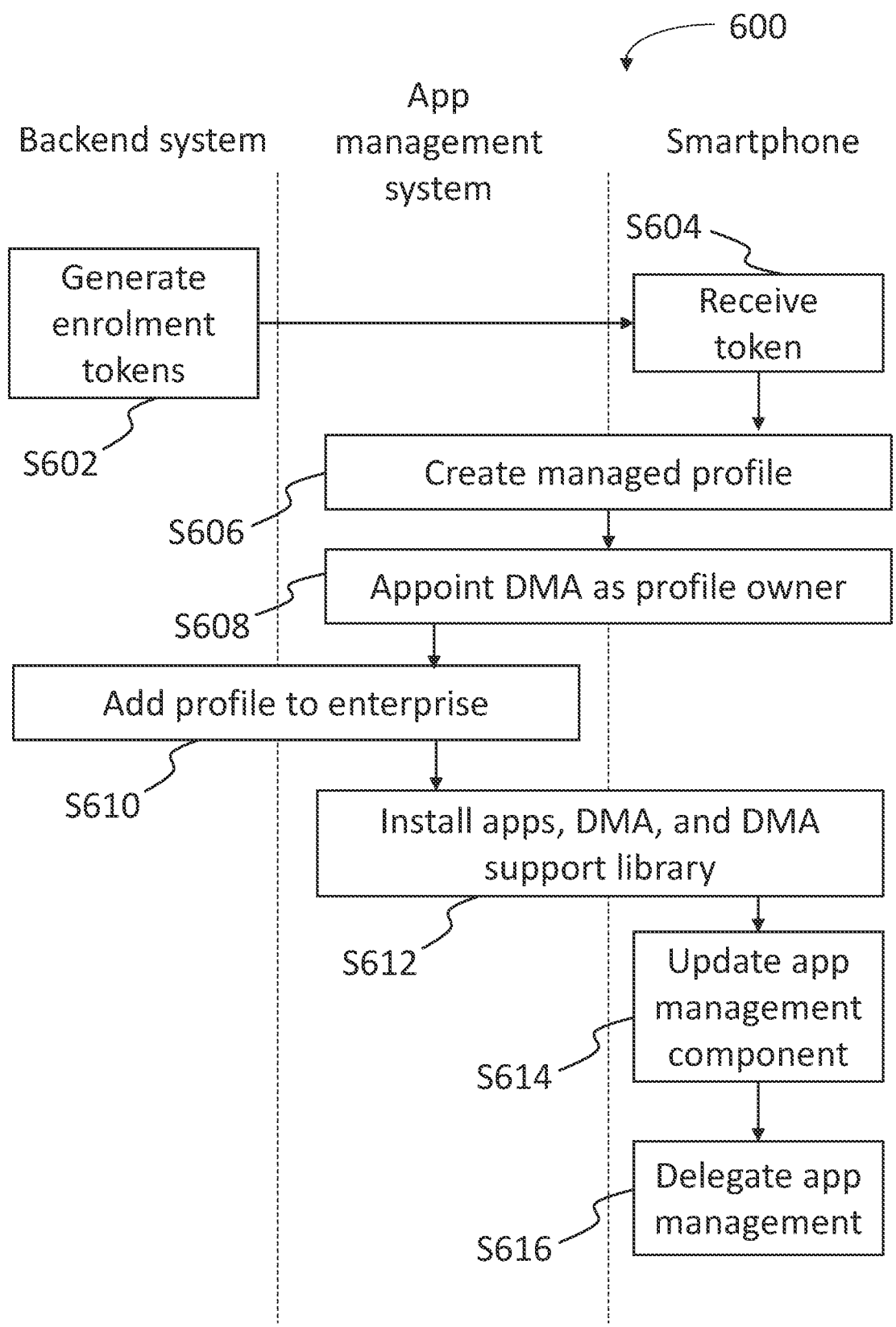
FIG. 6 is a flow diagram representing a method for enrolling a smartphone with a server in accordance with an embodiment of the present invention.

As mentioned above, during enrolment of the smartphone 102 with the backend system 106, the DMA 116 is appointed as the owner of the managed profile of the smartphone 102. FIG. 6 shows an exemplary method 600 by which the smartphone 102 is enrolled with the backend system 106. Prior to the method 600 being carried out, an enterprise is onboarded with the backend system 106 and the MDM system 108, which results in respective "enterprise" resources being generated at the backend system 106 and at the MDM system 108. An enterprise admin of the web console 104 may specify preferences, such as apps that are automatically added to a user device enrolled with the enterprise, and managed configurations for those apps and/or for other apps that may be installed by a user. These preferences are communicated to the MDM system 108 so that the MDM system 108 can perform app management of user devices enrolled as enterprise devices. The backend system generates, at S602, enrolment tokens for enrolling user devices with the enterprise. In this example, the enrolment tokens containing key-value pairs specifying information specific to the enterprise and necessary for the enrolment of the device, for example including a download location for the DMA 116.

The smartphone 102 receives an enrolment token at S604. The smartphone 102 may receive the enrolment token by any suitable means, for example by scanning a 2D barcode (such as a Quick Response (QR) code) or by Near Field Communication (NFC). The smartphone 102 communicates data from the enrolment token to the MDM system 108, which begins a process of creating, at S606, a managed profile for the smartphone 102. In the present example, creating the managed profile includes creating an account with the app management system for the managed profile. The DMA 116 (which is an instance of a DMA provided by the operator of the backend system 106) is appointed as the owner of the managed profile at S608.

The backend system 106 and the MDM system 108 add, at S610, the managed profile to the respective enterprise resources mentioned above. In some examples, the backend system 106 may further add the managed profile to a group within the enterprise resource.

The MDM system 108 installs the apps 112, the DMA 116, and the DMA support library 140 on the smartphone 102. The DMA support library 140 includes functions (namely, helper and utility classes) that allow the DMA 116 to update the app management component 114 on the smartphone 102 to satisfy minimum version requirements necessary for the app management component 114 to perform app management as described above. The DMA 116 updates, at S614, the app management component 114 accordingly, and once the app management component 114 has been updated, the DMA 116 delegates, at S616, app management to the app management component 114.

The above embodiments are to be understood as illustrative examples of the invention. Further embodiments of the invention are envisaged. For example, in some embodiments a DMA does not delegate app management to an app management component as described above, and is configured to implement managed configurations of apps as well as device policies. In such embodiments, the device policy schedule may further include managed configuration states for apps, providing additional flexibility for enterprises to manage a device in accordance with the present invention.

In a further example, a DMA may be configured to monitor app usage on a user device, for example by configuring a broadcast receiver module to receive broadcasts when apps are opened on the user device. The DMA may use this information, for example, to determine which is the most used app over a certain period of time, allowing the DMA to enact a device policy state that specifies that the most used app or apps should be disabled. Furthermore, the DMA may transmit data to a backend system indicating how often, and when, different categories of apps are used. By collecting such data from a large number of devices (for example within a single enterprise, or across multiple enterprises), the backend system may configure device policy schedules to be more effective at incentivising users. Alternatively, or additionally, a backend system may process data relating to a large number of user devices, for example using reinforcement learning or other machine learning techniques, to determine how effective a particular device policy schedule or a particular device policy state has been in terms of incentivising users to pay bills.

In a further example, a user device may have multiple profiles (for example, a work profile and a personal profile), and one or more respective DMAs may be owners of one or more of the profiles, such that the functionality of the user device in respect of that profile is only controlled by the respective DMA.

As mentioned already, as well as in smartphones, the invention has applicability to desktop computers, laptop computers and tablet computers. More broadly, the invention has application to any user device having a transceiver, a processor, and a memory storing a device management application arranged to control functionality of the user device in accordance with an operative device policy state of the user device. Accordingly, in addition to smartphones, the invention could be applied to, for example: Internet-of-Things (IOT) enabled consumer devices such as televisions, central heating controllers, washing machines, fridges and the like. For the example of an IOT-enabled television, the different policy states in the policy schedule block certain television services, or classes of television service. For the example of an IOT-enabled washing machine, the different policy states in the policy schedule may block functionality like the ability to operate the washing machine over the Internet.

It will be appreciated from the above description that the technology of the invention has applicability to leasing operations in which user devices are leased to consumers or businesses, with the leasing company maintaining some control of the leased user devices. The technology of the invention has further applicability, for example when a business enterprise provides employees with user devices but requires that the user devices are regularly connected to the Internet for security reasons or requires that the user devices have all their social media apps disabled during office hours.

As discussed above, the device policy schedule specifies a queue of policy states, with each policy state specifying rules concerning the operation of the user device. These rules may involve disabling software applications, or classes of software application. These rules may also involve disabling hardware functionality such as a camera or a GPS location detecting device. These rules may also allow finer control, such as disabling the ability of a particular software application to access a particular hardware functionality.

As discussed above with respect to FIG. 5, a timer function can be used to switch a user device into a terminal state if the user device has not been able to perform a synchronisation of the device policy schedule for a predetermined period of time. This functionality could be extended by monitoring the time since the last synchronisation and as that time increases progressing through some, or all, of the policy states of the device policy schedule at respective elapsed time intervals since the last synchronisation of the device policy schedule until the terminal policy state is eventually reached.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A user device comprising a transceiver, a processor, and a memory, wherein the memory holds:
    a device management application arranged to control functionality of the user device in accordance with an operative device policy state of the user device; and
    a local device policy schedule comprising a queue of device policy states each comprising a respective set of policy data,
    wherein:
        the local device policy schedule corresponds to a remote device policy schedule at a remote system and responsive to receiving, from the remote system via the transceiver, synchronisation data indicating a first device policy state in the queue of device policy states, the device management application is arranged to update the operative device policy state of the user device to the first device policy state in the event that the operative device policy state is not the first device policy state;
        the device management application is configured to monitor when software applications installed on the user device are opened;
        upon updating the operative device policy state to the first device policy state, the device management application is configured to control the functionality of the user device by selectively disabling the software applications installed on the user device; and
        the selective disabling is performed in dependence on how often the software applications installed on the user device are opened.

2. The user device of claim 1, wherein the selective disabling comprises disabling a most used one or more software applications installed on the user devices over said period of time.

3. The user device of claim 1, wherein the selective disabling comprises selectively disabling one or more categories of software applications.

4. The user device of claim 1, wherein the device management application is arranged to control the functionality of the user device by disabling at least one function of the user device.

5. The user device of claim 1, wherein the device management application is arranged to control the functionality of the user device by disabling the ability of a software application to access a function of the user device in accordance with a policy state.

6. The user device of claim 1, wherein responsive to receiving second synchronisation data from the remote system via the transceiver, the device management application is arranged to update the operative device policy state of the user device from the first device policy state to a second device policy state in the queue of device policy states.

7. The user device of claim 1, wherein upon determining that a predetermined interval of time has elapsed since a most recent receipt of synchronisation data from the remote system, the device management application is arranged to update the operative device policy state of the user device to a terminal device policy state in the queue of device policy states.

8. The user device of claim 7, wherein the terminal device policy state is more restrictive of the functionality of the user device than the operative device policy state of the user device before being updated to the terminal device policy state.

9. The user device of claim 7, wherein the device management application is arranged to update the operative device policy state of the user device progressively through two or more policy states of the device policy schedule at respective elapsed times since the most recent synchronising of the device policy schedule.

10. The user device of claim 1, wherein the receiving of the first synchronisation data comprises receiving a push notification or a short message service (SMS) message indicating the first device policy state.

11. The user device of claim 1, wherein the user device is a smartphone.

12. A method of remotely managing a user device, comprising:
    provisioning the user device with a device management application configured to control functionality of the user device in accordance with an operative device policy state of the user device;
    provisioning the user device with a local device policy schedule comprising a queue of device policy states each comprising a respective set of policy data;
    storing a remote device policy schedule at a remote system, wherein the remote device policy schedule corresponds to the local device policy schedule;
    receiving usage data from the user device indicative of how often software applications installed on the user device are used;
    determining one or more of the software applications installed on the user device to disable in dependence on how often the software applications installed on the user device are indicated to be used;
    setting, at the remote system, the operative device policy state for the user device to a first device policy state in the queue of device policy states; and
    transmitting, from the remote system to a transceiver of the user device, synchronisation data indicating the first device policy state,
    wherein the first device policy state indicates disabling the determined one or more software applications installed on the user device.

13. The method of claim 12, wherein the determined one or more software applications include a one or more most used software applications over said period of time.

14. The method of claim 12, wherein:
said user device is a first user device;
said usage data is first user data;
the method comprises receiving further usage data from further user devices indicative of usage of software applications installed on the further user devices; and
the determining of the one or more software applications is further dependent on the further usage data.

15. The method of claim 14, wherein the determining of the one or more software applications includes processing the first user data and the further user data using a machine learning algorithm.

16. A non-transient storage medium comprising machine readable instructions which, when executed by a processor of a user device, cause the user device to:
monitor when software applications installed on the user device are opened; and
responsive to receiving from a remote system via a transceiver of the user device, synchronisation data indicating a first device policy state in a queue of device policy states of a local device policy schedule stored at the user device and corresponding to a remote device policy schedule at a remote system:
update an operative device policy state of the user device to the first device policy state in the event that the operative device policy state of the user device is not the first device policy state; and
control functionality of the user device in accordance with the updated operative device policy state by selectively disabling the software applications installed on the user device,
wherein the selective disabling is performed in dependence on how often the software applications installed on the user device are opened.

* * * * *